UNITED STATES PATENT OFFICE.

ALFRED RHEINER, OF BASEL, SWITZERLAND, ASSIGNOR TO CHEMICAL WORKS, FORMERLY SANDOZ, OF BASEL, SWITZERLAND, A FIRM.

MANUFACTURE OF SUBSTANTIVE DYESTUFFS OF THE STILBENE SERIES.

No Drawing. Application filed December 13, 1926, Serial No. 154,653, and in Germany December 19, 1925.

It is known that dinitrostilbenedisulphonic acid, dinitrodibenzyldisulphonic acid or the dyestuffs obtained by the action of caustic soda on p-nitrotoluenesulphonic acid (curcumine S, sun yellow, naphtamine yellow) give valuable substantive colors if they are condensed with amidoazo-compounds. These dyestuffs possess besides good fastness properties, as for instance good fastness to chlorine, but an insufficient fastness to alkali (United States Letters Patent No. 903,284). It is further known that dyestuffs of the stilbene series which are easily oxidizable and are, therefore, not fast to chlorine, can be transformed into dyestuffs fast to alkali and to chlorine by a treatment with oxidizing agents (German specifications No. 42,466 and 96,107).

It was, therefore, surprising to find that also the dyestuffs of the United States Letters Patent No. 903,284, which resist to oxidizing agents and are fast to chlorine, can be transformed without any appreciable loss, by a powerful oxidation, into dyestuffs which are fast to alkali. Besides the improvement of the fastness to alkali, this oxidation effects a considerable enhancement of the shade, which constitutes a second technical progress of the new process.

The following examples illustrate the process, without limiting it to the proportions and working conditions specified.

Example 1.

50 kg. of the condensation product of dinitrostilbenedisulphonic acid with metanilic-acid-azo-m-amido-p-cresolicmethylether, obtained according to Example 3 of the United States Letters Patent No. 903,284, are dissolved in 500 litres of water and 10 kg. of caustic soda of 30 per cent. Then, 200 litres of a sodium hypochlorite solution of 10 per cent are added and the mixture heated to boiling with constant stirring, until the oxidation is achieved. The solution is afterwards neutralized by means of hydrochloric acid and the dyestuff salted out. It constitutes a red powder which is easily soluble in water with orange red coloration, dissolves in concentrated sulphuric acid with blue color and dyes cotton of bright reddish orange tints. It distinguishes itself easily from the untreated starting material by its good fastness to alkali and by a clearer shade.

The constitution of the condensation product used in this example cannot be exactly defined. It may be represented by the following formula:

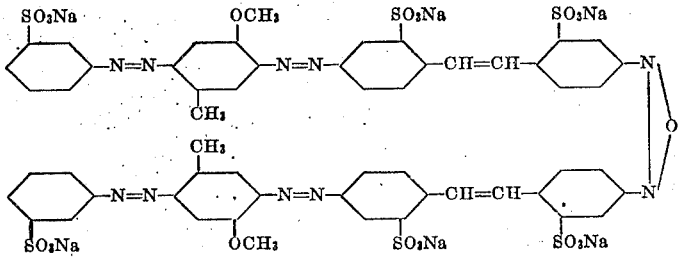

so that the operation of oxidation with $\frac{3}{2}O_2$ may convey to an oxidation product of the following formula:

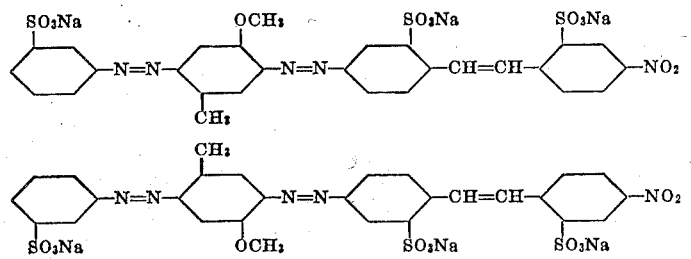

Example 2.

50 kg. of the condensation product of dinitrostilbenedisulphonic acid with sulphanilic acid-azo-α-naphtyl-amine, obtained according to Example 1 of the United States Letters Patent No. 903,284 are dissolved in 500 litres of water and 200 kg. of caustic soda of 30 per cent. This mixture is then treated at boiling temperature with chlorine introduced successively and cautiously until the alkali is consumed. The resulting dyestuff, which is fast to alkali and of a clearer shade, is then salted out. It constitutes a red powder which is easily soluble in water with red coloration, dissolves in concentrated sulphuric acid with violet blue color and dyes cotton of orange red tints.

The constitution of the condensation product used in this example cannot be exactly defined. It may be represented by the following formula:

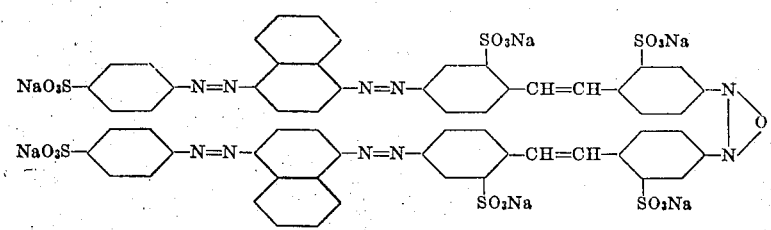

so that the operation of oxidation with $\frac{3}{2}O_2$ may convey to an oxidation product of the following formula:

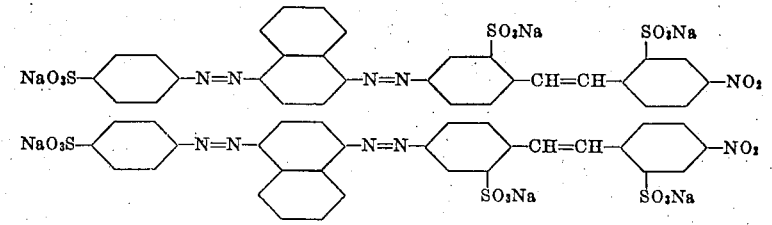

Example 3.

50 kg. of the product obtained according to the United States Letters Patent No. 951,047 by condensation of curcumine S having the formula:

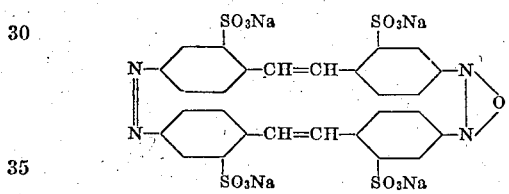

with amidoazotoluenesulphonic acid are dissolved in 500 litres of water, then 100 kg. of calcium hypochlorite are added and the mass heated under reflux until the oxidation is achieved. The solution is then diluted with water, subjected to precipitation with soda, filtered hot and the dyestuff salted out. The obtained dyestuff constitutes an orange powder, which is easily soluble in water with yellowish orange coloration; its solution in sulphuric acid is of violet red color. It dyes cotton of yellowish orange tints and is contrarily to the starting material fast to alkali and gives a more yellowish and purer shade. It appears impossible to give the exact formula of constitution of the condensation product used in this example, so that the operation of oxidation cannot be exactly represented by a formula.

What I claim is:

1. A process for the manufacture of substantive dyestuffs of the stilbene series, fast to alkali, consisting in treating with oxidizing agents the dyestuffs, obtained by the condensation of dinitrostilbene- or dinitrodibenzyldisulphonic acid with amidoazocompounds.

2. A process for the manufacture of substantive dyestuffs of the stilbene series, fast to alkali, consisting in treating with oxidizing agents the products of condensation of the dyestuffs obtained by the action of caustic soda on p-nitrotoluenesulphonic acid (curcumine S, sun yellow, naphtamine yellow) with amidoazocompounds.

3. As new products of manufacture, the substantive dyestuffs such as obtained by the oxidation of the products of condensation of dinitrostilbene- or dinitrodibenzyldisulphonic acid with amidoazocompounds and constituting red to orange powders easily soluble in water with orange to red coloration, dissolving in sulphuric acid with blue to violet red coloration and dyeing cotton of red orange to yellowish orange tints.

In witness whereof I have hereunto signed my name this 26th day of November, 1926.

ALFRED RHEINER.